Dec. 13, 1927.

C. N. CLARK 1,652,762

WAGON

Filed June 18, 1923

3 Sheets-Sheet 2

Inventor
Charles N. Clark
by Jas. H. Churchill
Atty.

Dec. 13, 1927.

C. N. CLARK 1,652,762

WAGON

Filed June 18, 1923

3 Sheets-Sheet 3

Inventor
Charles N. Clark
By Jas. H. Churchill
Atty.

Patented Dec. 13, 1927.

1,652,762

UNITED STATES PATENT OFFICE.

CHARLES N. CLARK, OF SOMERVILLE, MASSACHUSETTS.

WAGON.

Application filed June 18, 1923. Serial No. 646,023.

This invention relates to wagons and like vehicles provided with a body capable of being inclined to facilitate the discharge of the load carried by said body.

The invention has for one of its objects to provide a simple, efficient and inexpensive mechanism for hoisting the body into an inclined position.

The invention further has for its object to provide a hoisting mechanism with which a maximum elevation of the wagon body may be obtained in a wagon or vehicle whose chassis or perch is substantially close to the ground.

To this end, the hoisting mechanism is provided with a member for elevating the wagon body and for supporting the same in its elevated position, which member is capable of being turned into a substantially horizontal position beneath the wagon body when the latter is in its lower position.

The body supporting member may and preferably will be constructed and arranged to lock the body to the chassis or perch and prevent undue movement of the body with relation to the chassis or perch with said body in its horizontal or lowered position.

These and other features of this invention will be pointed out in the claims at the end of this specification.

Figure 1:
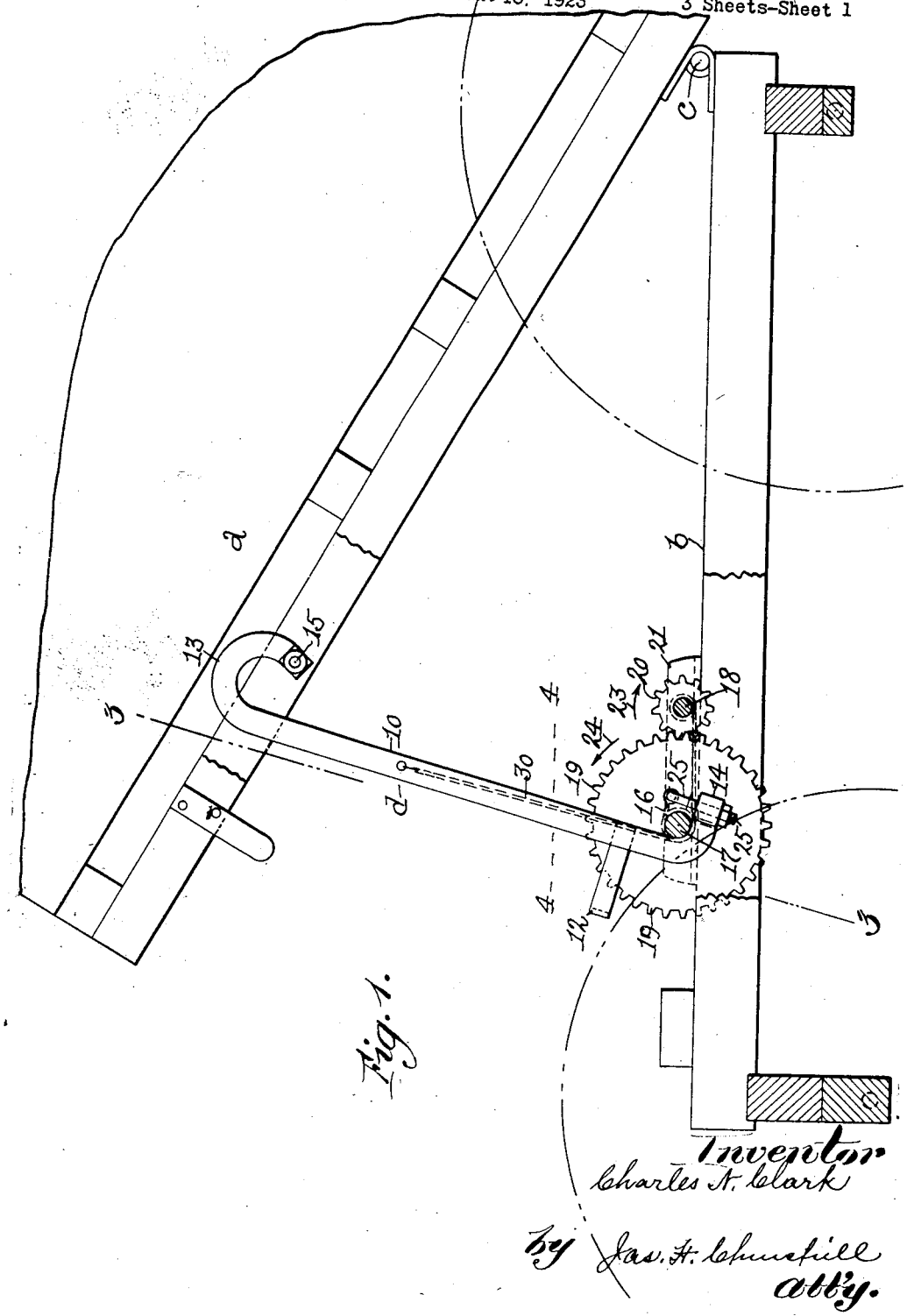

Fig. 1 represents in side elevation a sufficient portion of a wagon having a hoisting mechanism embodying the invention, the wagon body being shown in its elevated position.

Figure 2:
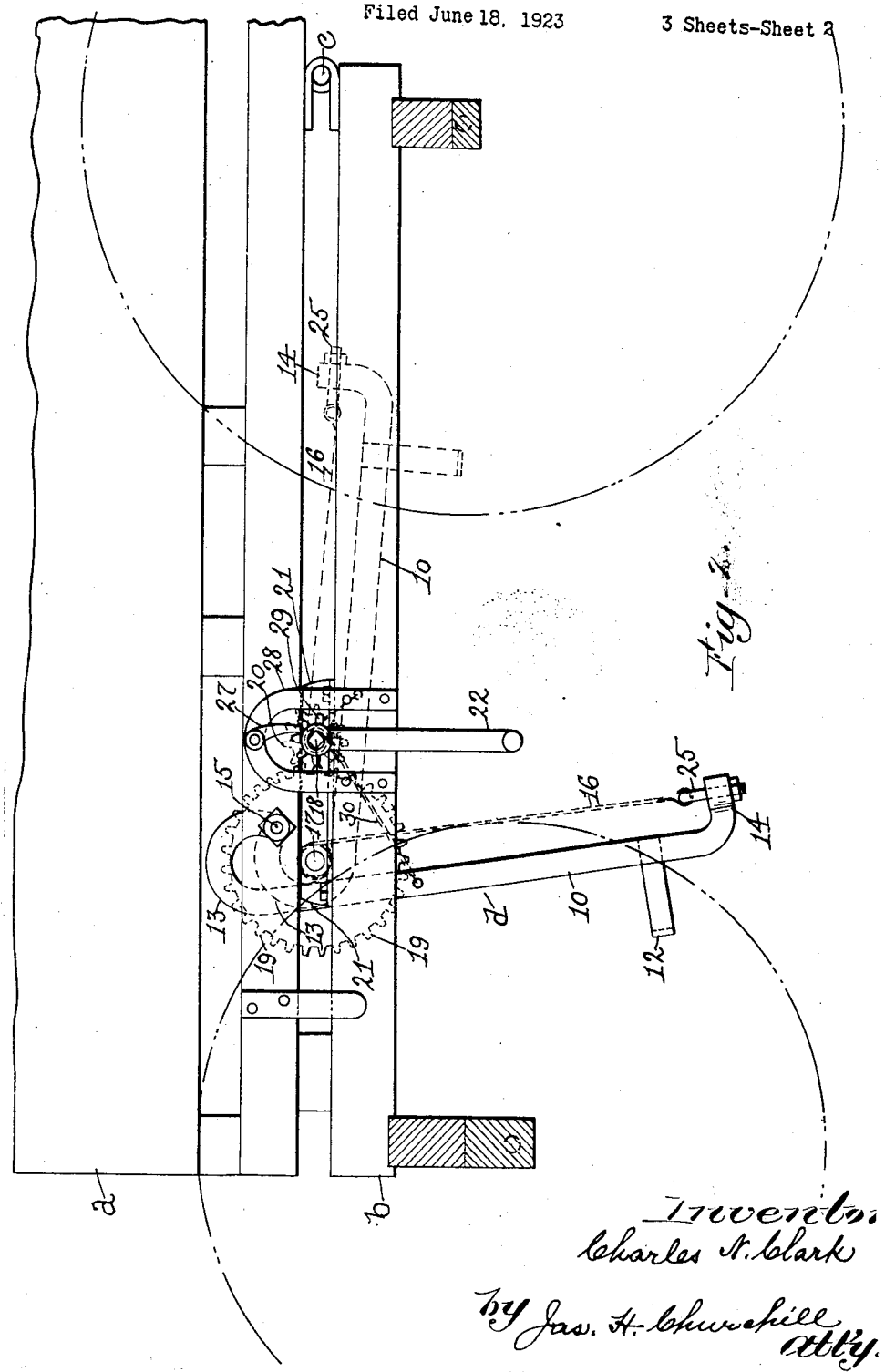

Fig. 2, a side elevation with the wagon body in its lowered position and showing the supporting member in two positions.

Figure 3:
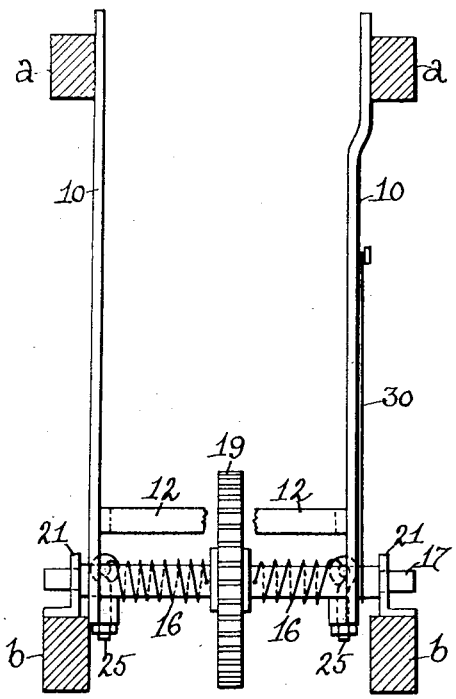

Fig. 3, a vertical section taken on the line 3—3, Fig. 1, and

Figure 4:
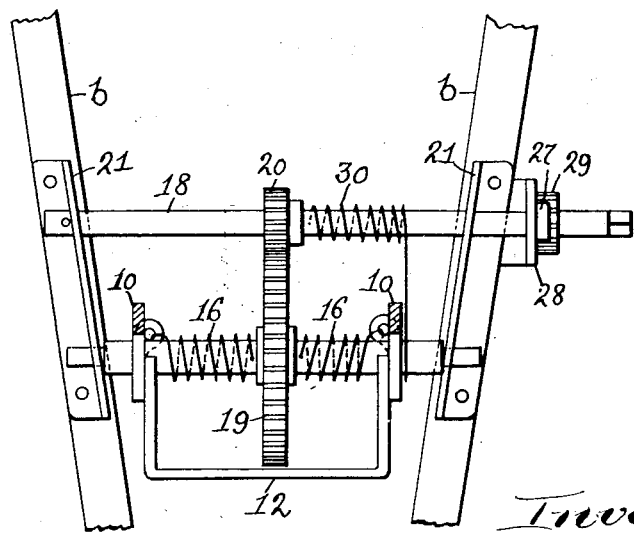

Fig. 4, a horizontal section on the line 4—4, Fig. 1.

Referring to the drawing, $a$ represents the body and $b$ the chassis or perch of a dumping wagon or vehicle, such for instance as a wagon for carrying coal, sand or like material. The body $a$ as herein shown is pivoted at its rear end at $c$ to the chassis or perch $b$ and its front end is designed to be elevated from a substantially horizontal position shown in Fig. 2 into an inclined position shown in Fig. 1.

This elevation of the front end of the wagon body $a$ is effected by a hoisting mechanism preferably of the construction herein shown.

The hoisting mechanism herein shown is provided with a supporting member $d$, comprising two substantially long straight side bars 10 spaced apart and connected by a cross bar 12. Each bar 10 has at its upper end a curved arm 13 and at its lower end a substantially straight arm 14 extended substantially at right angles to the bar 10.

The curved arm 13 is pivoted at 15 to the wagon body and the arm 14 has connected to it one end of a chain, cord or other flexible connection 16, whose other end is fastened to a shaft 17 supported by the chassis or perch $b$. The shaft 17 may be designated the hoisting shaft and is connected with a main or driving shaft 18 also supported by the chassis or perch, and in the present instance the shaft 17 has fast thereon a relatively large gear 19, which meshes with and is driven by a pinion 20 on the shaft 18.

The gear 19 is located near the center of the shaft 17 and the chains 16 are attached to the said shaft near said gear and are designed to be wound upon the shaft, see Fig. 3, when the shaft is rotated in the proper direction to wind the chains thereon and thus elevate the wagon body.

The side bars 10 of the supporting member are connected with the wagon body at or near the opposite sides of the latter.

The shafts 17, 18 may and preferably will be mounted in angle iron supports 21 secured to the chassis or perch $b$, see Fig. 4, and the shaft 18 is provided at one end thereof with a crank or handle 22. The wagon body $a$ with the load therein may be turned from its normal or horizontal position shown in Fig. 2 into its inclined or discharging position shown in Fig. 1 by the operator turning the handle 22 in the direction of the arrow 23 in Fig. 1, which causes the pinion 20 to turn the large gear 19 and its shaft 17 in the direction of the arrow 24, thereby winding upon the shaft 17 the chains 16, and through the latter elevating the supporting member to whose arms 14 the chains 16 are connected, preferably by means of screw rods or bolts 25 which are in threaded engagement with the arms 14 to adjust the chain and take up slack therein.

The body $a$ may be retained in its elevated position by means of a holding pawl 27 pivoted to a support 28 attached to the chassis or perch $b$ and cooperating with a toothed wheel 29 on the shaft 18. When it is desired to lower the wagon body from its elevated position, the holding pawl 27 is disengaged from the toothed wheel 29 and the descent of the body is controlled by the operator through the handle 22, or if desired by a suitable brake in a manner well understood.

In order to obtain a maximum elevation of the wagon body, when the latter is mounted on a chassis or perch which sets low or relatively close to the ground, provision is made whereby the supporting member may be made long enough to obtain the elevation desired, without danger of the supporting member being in such close proximity to the ground as to be struck and injured by obstructions in the roadway.

For this purpose, the supporting member is pivoted at its upper end, so that its lower end can be turned toward the wagon body and preferably into a substantially horizontal position, indicated by dotted lines in Fig. 2.

This result is effected in the present instance by attaching to the supporting member one end of a chain, cord or other flexible connection 30, whose other end is attached to the main shaft 18 in such manner as to be wound thereon when the said shaft is turned in the direction opposite to that indicated by the arrow 23, which takes place when the wagon body is being lowered. As the chain 30 is wound upon the shaft 18, it turns the body supporting member $d$ on its pivots 15 and elevates the lower or free end of said supporting member, so that, when the wagon body has been lowered into its normal or horizontal position, the supporting member is in a position substantially parallel with the roadway and elevated a substantial distance above the same, so as to clear any obstructions thereon.

It is preferred to automatically effect the turning of the body supporting member into its substantially horizontal position, but it is not desired to limit the invention in this respect.

Provision is also made for holding the wagon body against upward movement when in its normal or horizontal position, which may be accomplished as herein shown, by the body supporting member, whose upper arm 13 is curved and pivoted in such position with relation to the shaft 17 as to allow the side bars 10 of said member to be brought under and close to the said shaft, when said body supporting member is in its substantially horizontal position, so that movement of the body upward is prevented or at least arrested by the engagement of the body supporting member with the shaft 17. The arm 14 on the body supporting member 10 cooperates with the underside of the shaft 17 to determine the extent to which the wagon body may be elevated by rotation of the shaft 18. From the above description, it will be seen that the wagon is provided with a simple, inexpensive and highly efficient hoisting mechanism, and while the construction herein shown may be preferred, it is not desired to limit the invention to the particular construction herein shown.

What I claim is:—

1. In a wagon, in combination, a body capable of being elevated into an inclined position, a hoisting mechanism for said body comprising a supporting member pivoted to said body, a rotatable hoisting shaft, a flexible connection cooperating with said supporting member and with said shaft to effect elevation of said supporting member and said wagon body by rotation of said shaft, a driving shaft for said hoisting shaft, and a flexible connection cooperating with said driving shaft and said body supporting member to turn the latter into a substantially horizontal position.

2. In a wagon, in combination, a body capable of being elevated into an inclined position, a hoisting mechanism for said body comprising a supporting member having substantially straight side bars provided at their upper and lower ends with laterally extended arms, means for pivotally connecting said upper arms to said wagon body to permit the lower arms thereof to be swung upwardly toward the said body when the latter is in its lowered position, a hoisting shaft, flexible means connecting the lower arms of said side bars with said hoisting shaft to effect elevation of said side bars and to cause said lower arms to engage said hoisting shaft and limit the upward movement of said side bars.

3. In a wagon, in combination, a chassis, a body mounted thereon and capable of being elevated into an inclined position, a rotatable hoisting shaft, a supporting member pivoted at its upper end to said body and capable of assuming a substantially vertical position with the lower end extended below the said chassis and also capable of having its free end turned upwardly toward the body when the latter is in its lowered position, a laterally extended arm on the free end of said supporting member co-operating with the hoisting shaft to limit the upward movement of said supporting member, and flexible means connecting said shaft with the arm on said supporting member.

In testimony whereof, I have signed my name to this specification.

CHARLES N. CLARK.